United States Patent [19]

Koller

[11] Patent Number: 4,556,148
[45] Date of Patent: Dec. 3, 1985

[54] RACK FORMED OF A PLURALITY OF PROFILED BARS

[76] Inventor: Ernst Koller, Paradiesstrasse 64, CH-4102 Binningen, Switzerland

[21] Appl. No.: 455,313

[22] Filed: Jan. 3, 1983

[30] Foreign Application Priority Data

Jan. 8, 1982 [DE] Fed. Rep. of Germany ....... 3200310

[51] Int. Cl.$^4$ ............................................... A47F 5/00
[52] U.S. Cl. .................................... 211/189; 108/111; 211/182; 211/187; 312/140; 403/219; 403/402
[58] Field of Search ............... 211/189, 187, 186, 191, 211/182, 190; 312/140; 248/244, 245; 108/111; 403/170, 217, 219, 402, 257, 387

[56] References Cited

U.S. PATENT DOCUMENTS

| | | | |
|---|---|---|---|
| 1,859,798 | 5/1982 | Rix | 312/140 |
| 3,144,265 | 8/1964 | Humble | 403/219 |
| 3,259,079 | 7/1966 | Freeman | 108/111 X |
| 3,767,237 | 10/1973 | Suchowski | 403/402 X |
| 4,078,847 | 3/1978 | Presnick | 312/140 |
| 4,126,364 | 11/1978 | Reilly | 312/140 |

FOREIGN PATENT DOCUMENTS

| | | |
|---|---|---|
| 1203435 | 10/1965 | Fed. Rep. of Germany . |
| 2411944 | 10/1974 | Fed. Rep. of Germany ...... 248/245 |
| 2300957 | 9/1976 | France ............................ 312/140 R |
| 1478589 | 7/1977 | United Kingdom . |
| 2082893 | 3/1982 | United Kingdom ................ 248/245 |

Primary Examiner—Robert W. Gibson, Jr.
Attorney, Agent, or Firm—Ostrolenk, Faber, Gerb & Soffen

[57] ABSTRACT

The disclosure concerns a rack for displaying articles and comprising an assembly of horizontally and vertically oriented profiled bars, each provided with longitudinal grooves within which displaceable clamping elements can be clamped. These clamping elements may be rack inserts or serve as supports for such inserts. Grooves of adjacent vertical bars open toward each other for receiving wall-like elements. Also, other grooves of the vertical bars open into the interior area of the rack. Profiled bars which meet at corners are connected to each other by plug elements which plug into the bars and are hidden by the bars.

14 Claims, 7 Drawing Figures

RACK FORMED OF A PLURALITY OF PROFILED BARS

BACKGROUND AND SUMMARY OF THE INVENTION

The present invention relates to a rack formed of a plurality of profiled bars arrayed vertically and horizontally.

Such racks can be used as sales stands at fairs and in shops, as display racks, and as open racks, and also as articles of furniture. The racks may also include walls and doors of any material.

The invention is directed at developing the rack in such a manner that inserts, for intance, trays, brackets, shelves and other supporting elements, and wall elements, such as walls of solid material or glass as well as doors, can be fastened without holes, slots, threads or other nattractive cuts in the material having to be made.

This object is achieved according to the invention, wherein the rack is comprised of a plurality of profiled bars, with at least four such bars oriented vertically. The vertical bars are joined by horizontal bars at junctions defined at the ends of the bars where they meet. Each vertical bar has at least two longitudinally extending grooves defined in from its surface and spaced apart around its circumference. The two grooves are spaced about 45° away from each other. In a bar of rectangular cross-section, a first one of the grooves extends on one side and the second one of the grooves extends along one corner. The grooves are adapted to clamp fast in them a structure element for supporting another object. The grooves are placed on the bars so that the first groove of one bar faces toward and is opposite the first groove on an adjacent bar, while the second groove on the bar faces into the interior or central area of the rack. The first grooves enable wall-like elements to be supported to extend between the two adjacent bars having the facing grooves. The second grooves are placed to enable supports to be provided for supporting something that extends in or is supported in the interior area of the rack. In a more preferred embodiment, each of the vertical bars also has a third groove which is spaced about 90° around the circumference of the bar from the first groove, and the second groove is between the first and second grooves, being spaced about 45° away from each of them. With this arrangement, there is a respective one of the first and third grooves facing toward a respective one of the first and third grooves on each next adjacent vertical bar.

In the preferred embodiments, the grooves widen into the bars, and particularly they they are dovetail shaped.

The invention enables the rack to be used in very diverse ways for the purposes indicated above. Further, inserts, such as walls, panes of glass and doors, can be fastened without holes or threads because elements are clamped in respective longitudinal slots in the profiled bars. The elements can be displaced into any desired position in and along the longitudinal slots and can be clamped in desired positions therein.

At a junction between three bars, two horizontal and one vertical, a plug connection may be provided between the profiled bars such that no holes, slots or threads are necessary and the plug connection is not visible from the outside. This enables simple assembly and provides an esthetically attractive appearance for the rack. The plug connection comprises three projecting elements, with each element oriented to extend into the respective end of a profiled bar, for supporting all three bars at the junction. The free ends of the bars are mitered or shaped so that when the plug connection is plugged into the ends of the bars, the mitered ends of the bars meet and the plug connection is hidden inside the bars.

In one preferred form, the bars meeting at the plug projection are hollow and are shaped internally to define two narrow width grooves spaced apart 90° around the bars. The plug connection comprises projecting plug elements which define angled legs that project into the respective grooves inside the bars.

Other objects and features of the invention will be described through the various embodiments described below with reference to the accompanying drawings.

DESCRIPTION OF A PREFERRED EMBODIMENT

Figure 1:
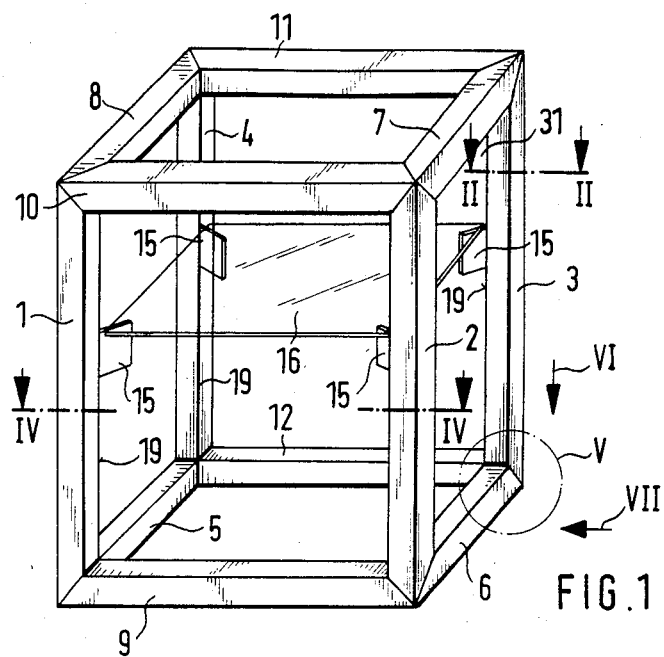
FIG. 1 is a perspective view of a rack in accordance with the invention.

The rack shown in FIG. 1 is comprised of twelve profiled bars 1 to 12. There are longitudinal grooves, which will be described further below, in and extending the length of the vertical profiled bars 1 to 4. Clamped fast in these grooves are support elements 15, which support a tray 16 consisting, for instance, of glass. The tray 16 can be shifted vertically in position by shifting the support elements 15 in the longitudinal slots of the profiled bars.

Figure 2:
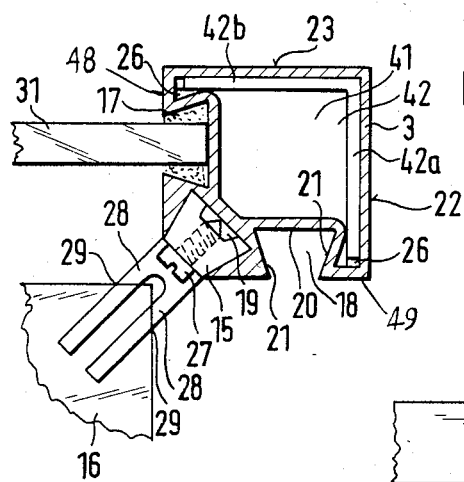
FIG. 2 is a sectional view of a vertical profiled bar of the rack of FIG. 1, along the section plane II—II.

The cross-sectional view of FIG. 2 shows the right rear profiled bar 3. This bar is representative of the other vertical bars. Profiled bar 3 is hollow and has longitudinal grooves 17 and 18 on its outside. These two grooves are spaced at an angle of 90° from each other in two adjacent perpendicular outer surfaces of the bar. Additionally, there is a longitudinal groove 19 arranged between the grooves 17 and 18 and at an angle of about 45° to each of them. The groove 19 is defined at the corner of the rectangular cross-section bar 3 between the groves 17 and 18. The longitudinal grooves 17, 18 and 19 preferably all have the same size cross-sectional area and the same shape, particularly dove-tailed, including a groove bottom 20 and groove side surfaces 21 which diverge toward the groove bottom 20. The basic cross-sectional shape of the profiled bar is quadrangular. The outer surfaces 22 and 23 of the profiled bar which are not provided with longitudinal grooves are flat and perpendicular. The longitudinal grooves 17 and 18 are provided in the adjoining perpendicular outer surfaces 48 and 49.

Inside the profiled bar, two inner longitudinal grooves 26 are formed, which are at an angle of 90° apart. All of the grooves 17, 18, 19 lie between the angle arms 26. The grooves 17 and 18 are each defined by two opposite side walls. The outer side walls each define one side of the respective grooves 26. The other sides of the grooves 26 are defined by the respective outer surfaces 22, 23 of the profiled bar. The grooves 26 are of narrow width. The inner longitudinal grooves 26 serve to receive the arms of a plug element which is of angular L-shape. Such a plug element for three adjoining profiled bars is described below in detail with reference to FIG. 5.

Figure 3:
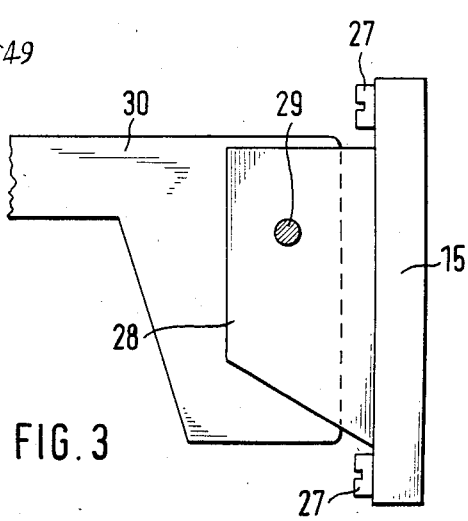
FIG. 3 is a side view of a structural element shown in FIG. 2, which can be clamped fast in a longitudinal groove of a profiled bar.

Referring to FIGS. 2 and 3, the support element 15 for a rack insert, for instance, for trays 16, can be shifted along any of the longitudinal grooves 17, 18 and 19. The support element 15 can then be clamped fast at a selected position by screws 27 which are screwed into threaded openings in the support element 15 so that their pointed ends rest on the groove bottom 20. The support element 15 may have tabs 28, which are arranged parallel to each other and are spaced vertically apart and include bore holes 29 for the fastening of inserts 30 by means of securing pins. The tabs 38 may support, for instance, diagonally extending connecting elements projecting between diagonally opposite vertical profiled bars 1 and 3 and 2 and 4 respectively.

The longitudinal groove 17 of the profied bar 3, which is arranged vertically at the right rear, faces the groove 18 of the profiled bar 4, which is arranged vertically at the left rear. A wall 31, for instance a pane of glass, can be inserted into these two opposed grooves 17, 18. The longitudinal groove 18 in bar 3, which is arranged at an angle of 90° to the previously discussed longitudinal groove 17 of the bar 3, can also serve, in the same way, to receive a wall 31 or a clamping element 15.

Figure 4:
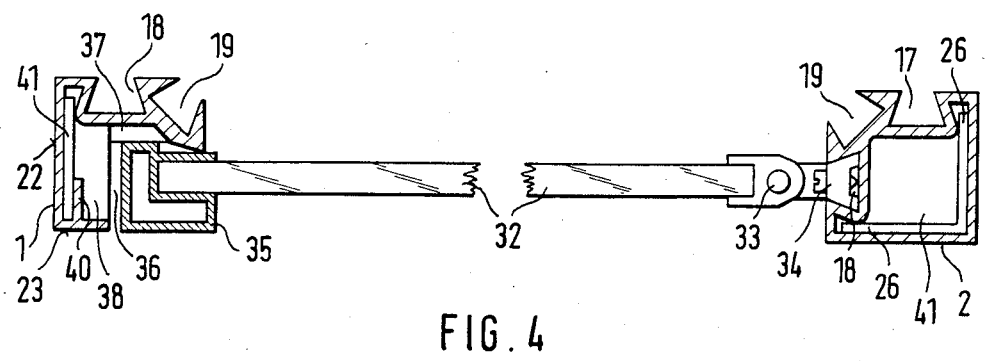
FIG. 4 is a sectional view through the two vertical, front profiled bars, with an inserted door wing, along the section plane IV—IV of FIG. 1.

FIG. 4 is a top sectional view showing the front two vertical profiled bars 1 and 2 with an inserted door 32. The door 32 is provided on the right-hand side of FIG. 4 with a hinge 33 which can be clamped fast in a selected position by a clamping device 34 in the longitudinal groove 18 of the profiled bar 2 at the front right. By loosening the clamping device 34, the hinge 33 can be adjusted in height. The door 32 may comprise, for instance, a pane of glass. On its left-hand side, the door has a stop element 35 attached on it, which is shaped to terminate flush with the outer surface 23 of the profiled bar 1 at the front left and also to rest within a recess 36 of the profiled bar 1 against a stop 37. In this way, the profile of the door does not project beyond the profile defined by the bars. The recess 36 replaces the outer longitudinal groove 17 of the profiled bar 1, either over the entire length of the profiled bar or over a length corresponding to the height of the door 32. The recess 36 can be partially filled with a filling material 38, preferably a heat-insulating material. This filling material 38 can at the same time be shaped to form the stop 37. Within the profiled bar 1, there is also a rib 40 which extends parallel to the outer wall surface 22 and is spaced from the wall thereof and is perpendicular to the outer wall surface 23, extending from the wall at 23 into the inside of the bar. The rib 40 serves as stop for a plug element 41.

Figure 5:
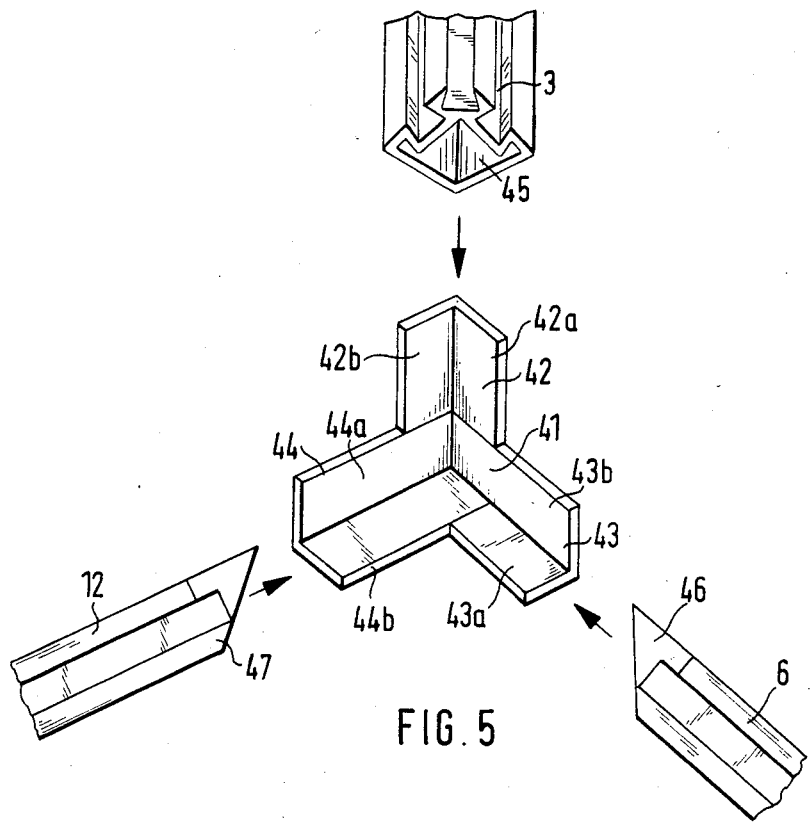
FIG. 5 is an exploded diagrammatic view of a junction of three profiled bars of the rack part V shown to the right rear in FIG. 1.

FIG. 5 is an exploded view, corresponding to the portion V shown in FIG. 1 at the rear bottom right of the rack, showing the three profiled bars 3, 6 and 12 and showing a plug element 41 in perspective having three arms 42, 43, 44 each bent in an L or angular shape. The profiled bars 3, 5 and 12 are placed on the angular arms 42, 43 and 44, respectively, wherein the two legs a and b of the individual arms 42, 43 and 44 are inserted into corresponding inner longitudinal grooves 26 of the respective profiled bars. The ends 45, 46 and 47 of the profiled bars 3, 6 and 12 respectively are mitered, i.e. are beveled upwardly along the two adjoining wall surfaces 48 and 49 that are provided with the outer longitudinal grooves 17 and 18 up to the corner with the groove 19, at an angle of 45° to the wall surfaces intersected by the beveled edges. In this way the wall surfaces 22, 23, 48 and 49 meet and completely surround the plug element 41 when they have been placed on this plug element. As a result, the profiled bars can be connected to each other rapidly and in an esthetically attractive manner without additional means and without bore holes, screws or other devices.

The other corners of the rack of FIG. 1 are developed in the same way.

Figure 6:
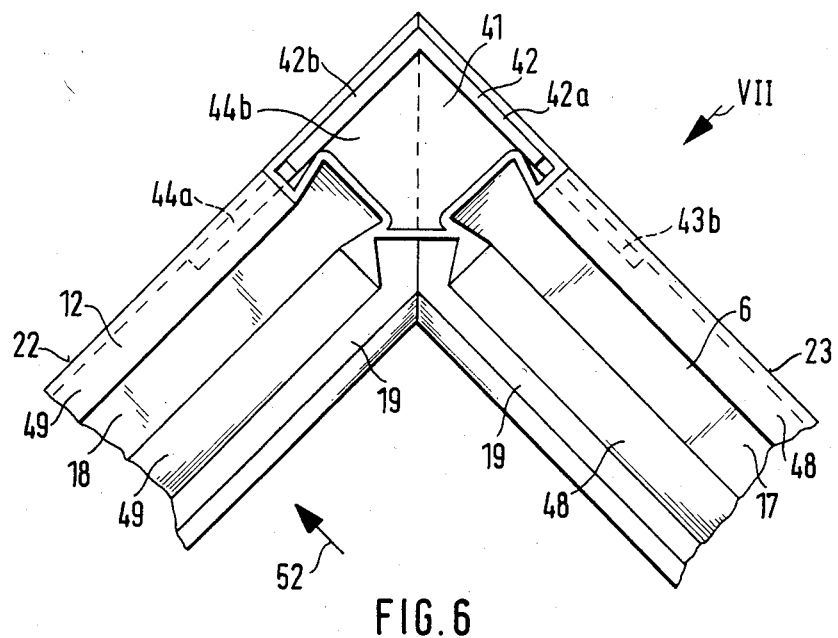
FIG. 6 is a top view of the two adjoining lower profiled bars of the rack portion V shown in FIG. 1 without the rear profiled bar which is seated vertically thereon.

FIG. 6 shows a top view on the ends 46 and 47 of the lower profiled bars 6 and 12. The profiled bar 12 has the same appearance, as viewed in the direction of the arrow 52 in FIG. 6, as the side of the profiled bar 6 shown in FIG. 6. Furthermore, FIG. 6 shows the position of the plug element 41 when the two profiled bars 6 and 12 are placed on it.

Figure 7:
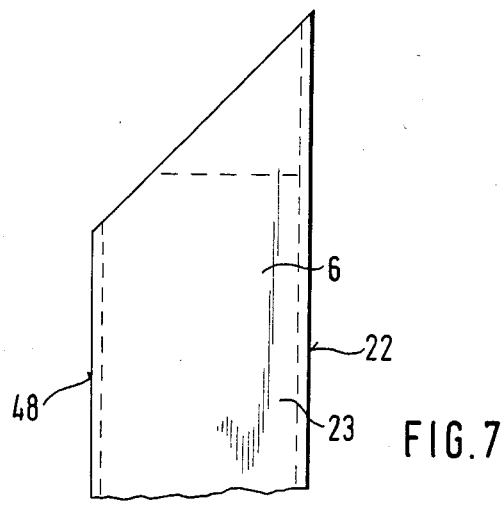
FIG. 7 is a side view of the horizontal profiled bar shown at the bottom right in FIG. 1, seen in the direction of the arrow VII indicated in FIGS. 1 and 6.

FIG. 7 is a view of the profiled bar 6 seen in the direction of the arrow VII of FIGS. 1 and 6.

The longitudinal groove 19 between the grooves 17 and 18 need not always lie precisely at an angle of 45° to the other longitudinal grooves 17 and 18. In the case of racks such as that shown in FIG. 1 which are wider than they are deep, the angle may differ approximately ±10° from 45° in order that the longitudinal grooves 19 of diagonally opposite profiled bars will still lie diametrically opposite each other.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A rack formed from a plurality of profiled bars, comprising at least four vertically oriented hollow bars positioned for enclosing an internal area; each vertical bar having at least two longitudinal grooves defined in the periphery of the bar; the grooves in each bar being spaced apart about the periphery of the bar about 45°; the grooves being adapted for clamping fast in them another structural element; the grooves being located around the periphery of the respective bars such that a first one of the at least two grooves of each bar are directed toward and opened opposite one of the two grooves of one of the two adjacent bars and the second of the two grooves of each bar are opened inwardly toward the interior area of the rack defined by the vertical bars; the hollow profiled bars being internally shaped for defining two narrow width internal grooves inside the bar with a third groove therein, the third groove being between the two internal grooves; a plug element having a plug-in section for each bar comprising an angled profile element with two legs, each of which legs is respectively received in one of the internal grooves; the ends of said bars at a junction are cooperatively shaped so that the coacting bar ends seat against each other for completely covering the inserted plug element for hiding the plug element.

2. The rack of claim 1, wherein each groove extends inward of the bar from the surface of the bar to the bottom of the groove, and the grooves having cross-sections which widen toward the bottoms of the grooves.

3. The rack of claim 1, wherein at least some of the bars have a third groove spaced about 90° around the periphery of the bar from the respective first groove of that bar; the second groove being between and spaced at an angle of 45° from the first and third grooves, wherein each first and third groove is opposite one of the first and the third grooves on the next adjacent bars.

4. The rack of claim 3, wherein each groove extends inward of the bar from the surface of the bar to the bottom of the groove, and the grooves having cross-sections which widen toward the bottoms of the grooves.

5. The rack of claim 4, wherein each groove is dovetail shaped.

6. The rack of claim 4, wherein each groove is of the same shape and cross-section.

7. The rack of claim 3, further comprising a plurality of horizontal profiled bars joining the vertical bars at the ends of the horizontal and vertical bars, wherein there are a plurality of junctions where three of the bars meet at the ends thereof.

8. The rack of claim 7, wherein the bars are hollow; a respective plug element including three projecting plug-in sections which are directed and shaped for being received inside the hollow bars at respective junctions between horizontal and vertical bars, whereby the bars at one of the junctions are held assembled together by the respective plug-in section there.

9. The rack of claim 8, wherein the ends of the bars at a junction are cooperatively shaped so that the coacting bar ends may seat against each other for completely covering the inserted plug element for hiding the plug element.

10. The rack of claim 9, wherein the ends of the bars at a junction are cooperatively mitered in shape.

11. The rack of claim 1, wherein the two internal grooves each being respectively defined between the side wall of the respective one of the first and third grooves which that internal groove is near and the exterior surface of the respective profiled bar at the respective one of the first and third grooves.

12. The rack of claim 11, wherein the angled profile element is L-shaped and the two legs thereof are the legs of the L.

13. The rack of claim 3, further comprising a structural element, which is displaceably receivable in at least one of the longitudinal grooves; the structural element comprising two tabs spaced apart from each other, and the tabs extending parallel to one another and extending away from the longitudinal groove, for supporting a rack insert therebetween.

14. The rack of claim 1, wherein between two adjacent vertical bars, a swing element is installed, and that element being swingably attached to swing on an axis parallel to the adjacent bar; the swing element having an outside dimension lying within the outside dimension of the profiled bars between which the swing element extends.

* * * * *